United States Patent

Hino et al.

[11] Patent Number: 5,890,053
[45] Date of Patent: Mar. 30, 1999

[54] AUTOMATIC DISPLAY MODE FOR A MULTIPLEX BROADCASTING RECEIVER

[75] Inventors: Terufumi Hino; Kousou Hayashi, both of Higashihiroshima, Japan

[73] Assignee: Sharp Kabushiki Kaisha, Osaka, Japan

[21] Appl. No.: 623,161

[22] Filed: Mar. 28, 1996

[30] Foreign Application Priority Data

Oct. 5, 1995 [JP] Japan .................................. 7-258340

[51] Int. Cl.⁶ .............................. H04B 1/06; G08B 5/22
[52] U.S. Cl. ........................ 455/186.1; 455/45; 455/566
[58] Field of Search ........................... 455/45, 66, 186.1, 455/186.2, 154.1, 158.4, 158.5, 180.1, 185.1, 572, 566, 567, 550, 121; 340/825.44; 345/169, 172

[56] References Cited

U.S. PATENT DOCUMENTS

| | | | |
|---|---|---|---|
| 5,285,493 | 2/1994 | Wagai et al. | 340/825.44 |
| 5,406,626 | 4/1995 | Ryan | 455/45 |
| 5,408,686 | 4/1995 | Mankovitz | 455/45 |
| 5,426,422 | 6/1995 | Vanden Heuvel et al. | 340/825.44 |
| 5,497,372 | 3/1996 | Nankoh et al. | 455/154.1 |
| 5,499,019 | 3/1996 | Burgan et al. | 340/825.44 |
| 5,543,781 | 8/1996 | Ganucheau, Jr. et al. | 340/825.44 |

FOREIGN PATENT DOCUMENTS

| | | | |
|---|---|---|---|
| 61-139125 | 6/1986 | Japan | 455/186.1 |
| 5-110999 | 4/1993 | Japan . | |
| 5-252123 | 9/1993 | Japan . | |

Primary Examiner—Reinhard J. Eisenzopf
Assistant Examiner—Lester G. Kincaid

[57] ABSTRACT

An FM multiplex broadcasting receiving apparatus includes a decoder for decoding multiplexed data from the received multiplex broadcasting, a CPU for writing the decoded content to RAM, a display unit for displaying the content stored in the RAM, an auto-mode switch for switching method of display of the information displayed on the display unit, and an audio signal reproducing circuit for selectively reproducing only the audio information from FM multiplex broadcasting. When the auto-mode switch is off, display corresponding to the audio sound reproduced by the audio signal reproducing circuit is given on the display unit. If the auto-mode switch is on, the display unit successively displays the contents of the information stored in the RAM, regardless of the audio sound reproduced by the audio signal reproducing circuit. Namely, by turning on the auto-mode switch, the user can see all the information stored, without any operation.

23 Claims, 14 Drawing Sheets

AUTOMATIC DISPLAY MODE FOR A MULTIPLEX BROADCASTING RECEIVER

BACKGROUND OF THE INVENTION

1. Field of the Invention

The present invention relates to a multiplex broadcasting receiver. More specifically, the present invention relates to an apparatus for receiving multiplex broadcasting having the claimed structure, for receiving and displaying digital data such as program information and weather information transmitted multiplexed on FM broadcast from a broadcasting station.

2. Description of the Background Art

A commercial FM radio broadcasting transmitting, in multiplexed manner, digital data such as program information, news and weather forecast utilizing a band not used for transmitting audio signals has been known. A receiver receives such digital data and displays the data on a display in the form of characters and graphics.

In order to receive desired digital data, a user operates the receiver in the following manner.

First, the user presses a menu key, for example, so that a program menu is displayed on a display of the receiver. Thereafter, the user selects the name of a desired program included in the program menu, and by pressing a determination key, for example, determines a program to be displayed. When the selected program includes a plurality of pages, the user feeds pages by manually operating an up/down key, for example, so as to switch the displayed content. When the user looks through all the pages and wishes to switch to another program, the user again operates a key so that the program menu is displayed, and the above described manual operation is repeated.

If it is not possible to display all the names of programs on the display at one time when the program menu is to be displayed, the user must switch the contents of the displayed program menu by means of the up/down key, for example.

Therefore, the conventional multiplex broadcasting receiver has a disadvantage that operation is troublesome.

Therefore, an object of the present invention is to provide an apparatus for receiving multiplex broadcasting which allows the user to see the content of a received program by a simple operation.

The apparatus for receiving multiplex broadcasting and for displaying the multiplexed data in accordance with the present invention includes a memory for storing a plurality of multiplexed data groups included in the multiplex broadcasting, and a display for successively displaying the stored plurality of data groups.

According to another aspect of the present invention, the apparatus for receiving multiplex broadcasting and for displaying multiplexed data includes a tuner for receiving the multiplex broadcasting, a decoder for obtaining multiplexed data from the received broadcasting, a memory for storing the obtained data, and a display unit for successively displaying the stored data.

According to the present invention, as the multiplexed data groups included in the multiplex broadcasting are stored and displayed successively, the multiplexed data can be seen without any complex key operation by the user. Therefore, the receiver is very convenient for use.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
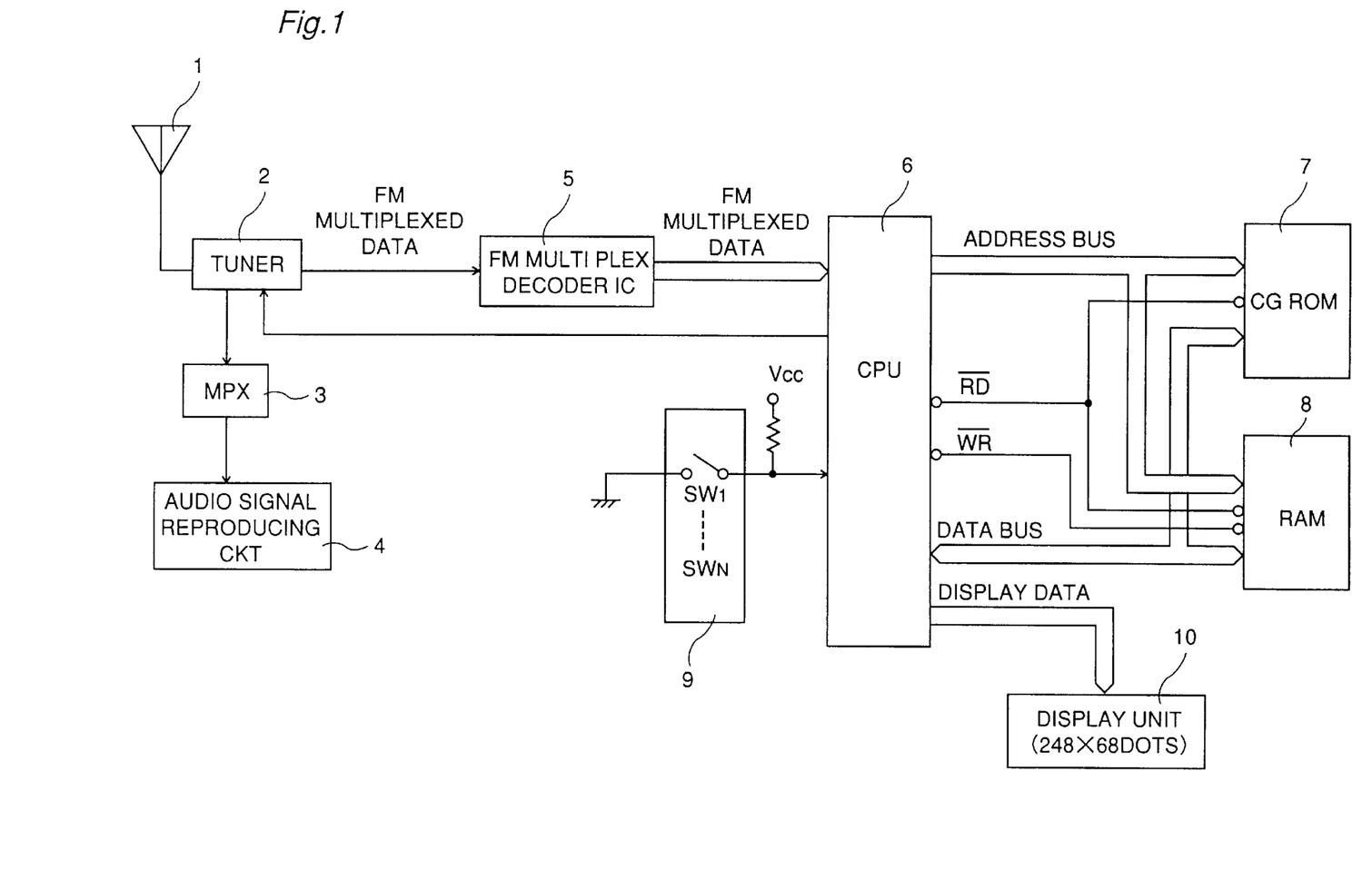
FIG. 1 is a block diagram of an apparatus for receiving FM multiplex broadcasting in accordance with a first embodiment of the present invention.

Referring to FIG. 1, the FM multiplex broadcast receiving apparatus in accordance with the first embodiment includes an antenna 1 receiving radio wave, a tuner for selecting a desired broadcasting station, a decoder IC 5 for decoding (including error correction) FM multiplexed data output from the tuner, a CPU 6 for processing the decoded data, an RAM (external memory) 8 storing the decoded data, a display unit (liquid crystal display) 10 for displaying the decoded data, a CGROM (Character Generator ROM) 7 for storing various graphic. patterns to be displayed on the display unit, a multiplexer 3 for separating and outputting audio signals only from the signals output from the tuner, a circuit 4 for reproducing audio signals output from the multiplexer, and switches 9 connected between the CPU and the ground for accepting an input from a user.

Switches 9 includes a power switch, a switch for tuning, and in addition, an "auto-mode switch" SW1.

By turning on/off the auto-mode switch SW1, the method of displaying programs on display unit 10 is switched.

When the auto-mode switch SW1 is off, program-linked display is given. In the program-linked display, multiplex broadcast linked with the program reproduced by audio signal reproducing circuit 4 is displayed on display unit 10 in principle. The program-linked display means, for example, a process for displaying, while a music program is received, the name of the tune which is being played, on the display unit. At this time, it is possible to display other arbitrary programs stored in the RAM 8 by the key operation, for example.

When the switch SW1 is on, program sequential display is given. In the program sequential display, the program stored in the RAM are successively displayed on display unit 10 in ascending order, at every prescribed time period, regardless of the program being reproduced by the audio signal reproducing circuit 4.

Figure 2:
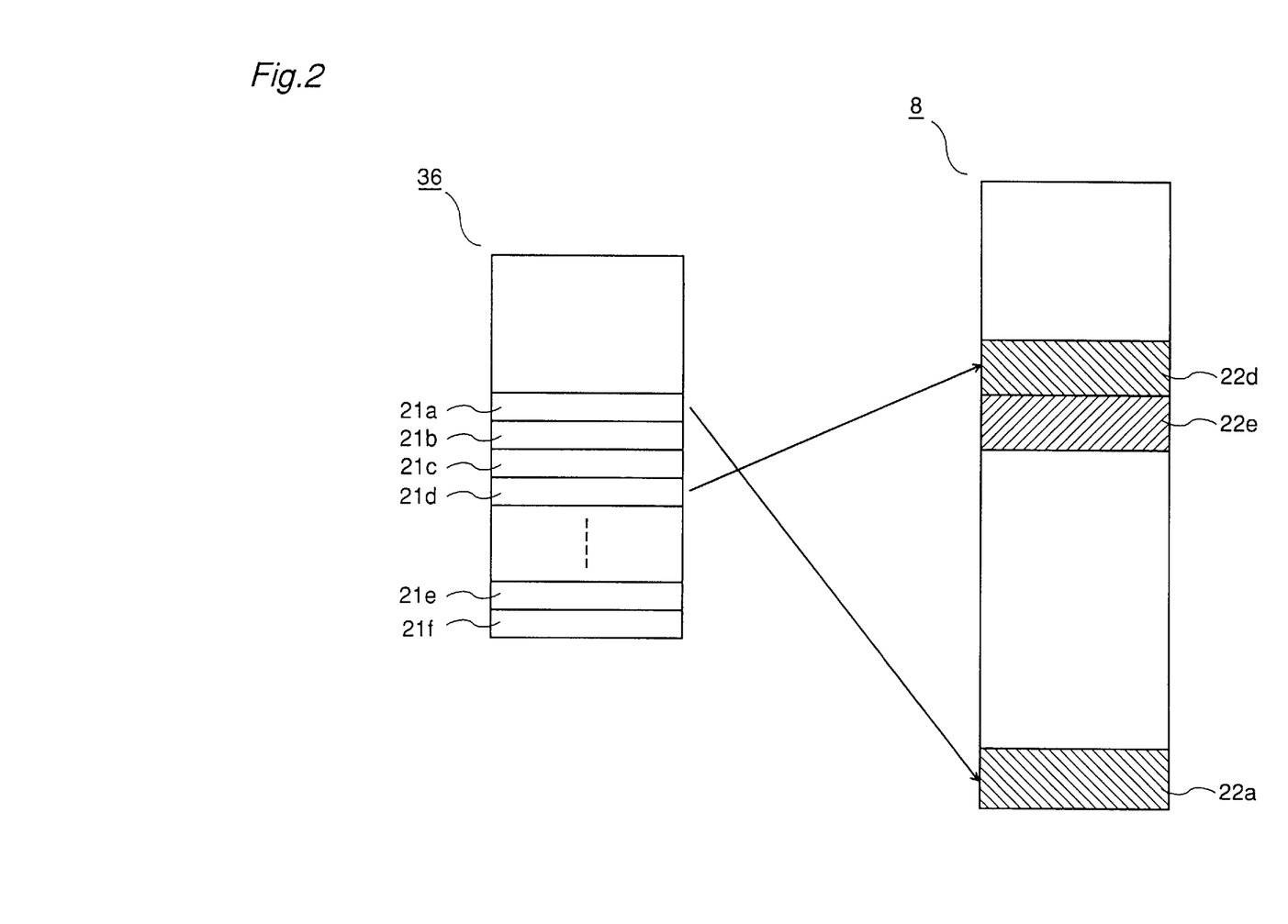
FIG. 2 shows relation between an address storing portion included in a CPU shown in FIG. 1 and program data stored in an RAM.

FIG. 2 shows relation between a program manager table 36 included in CPU 6 and data stored in the RAM 8.

Referring to FIG. 2, RAM 8 stores the contents displayed on display unit program by program and page by page, at prescribed addresses. The content displayed on the display unit includes data obtained by bit mapping of character code, for example.

The content to be stored includes content 22a for the program-linked display, and contents 22d, 22e for program sequential display. Further, the content when the program sequential display is given includes those related to menu display and those related to the content of the program.

Program manager table 36 includes address storing portions 21a to 21f for storing head addresses of respective data stored in RAM 8. Address storing portion 21a stores an address (head address of data 22a of the RAM) which is required when program-linked display is to be given.

Address storing portions 21b to 21f store addresses (head addresses of data 22d, 22e and so on stored in the RAM) which are required when program sequential display is to be given.

Program manager table 36 allows display of a desired program on the display unit.

Figure 3:
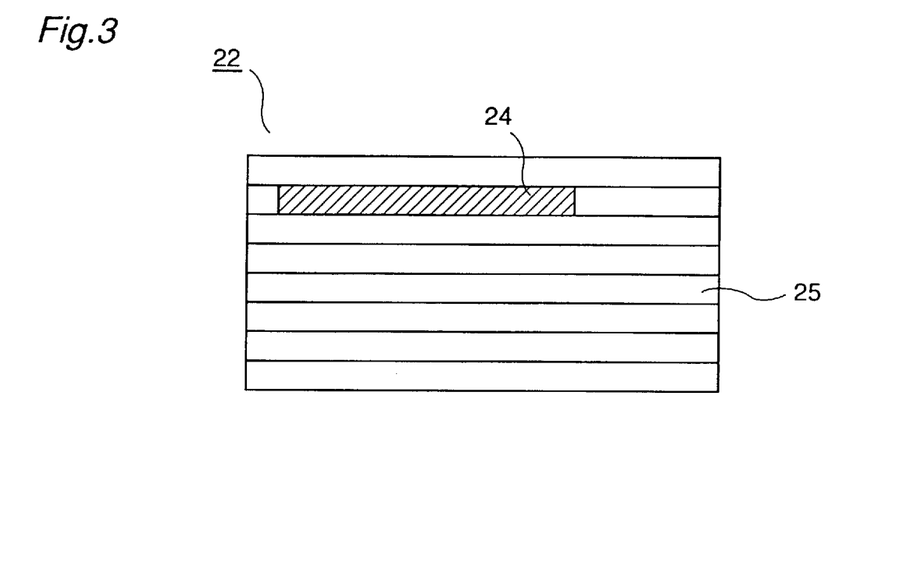
FIG. 3 shows specific structure of program data.

FIG. 3 shows a data structure for each data stored in the RAM.

Referring to FIG. 3, the data consists of a data unit 24 for relating data with each other, and bit map data 25.

Figure 4:
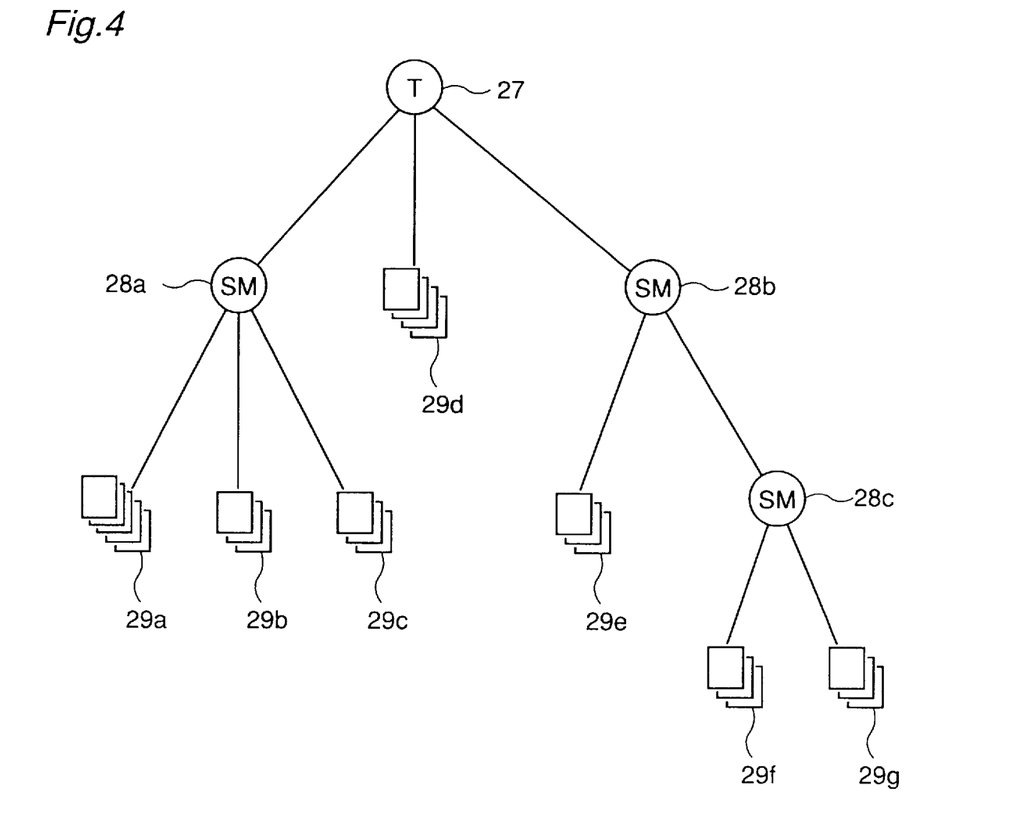
FIG. 4 shows a tree structure consisting of a plurality of program data.

By data unit 24, mutual relationship between stored data is indicated, and therefore, it becomes possible to obtain a tree structure including a plurality of program data, such as shown in FIG. 4.

As shown in FIG. 4, the tree structure includes one main menu 27, sub menus 28a and 28b positioned below the main menu, a sub menu 28c positioned further below the sub menu, and pages 29a to 29g positioned below the sub menus.

Figure 5:
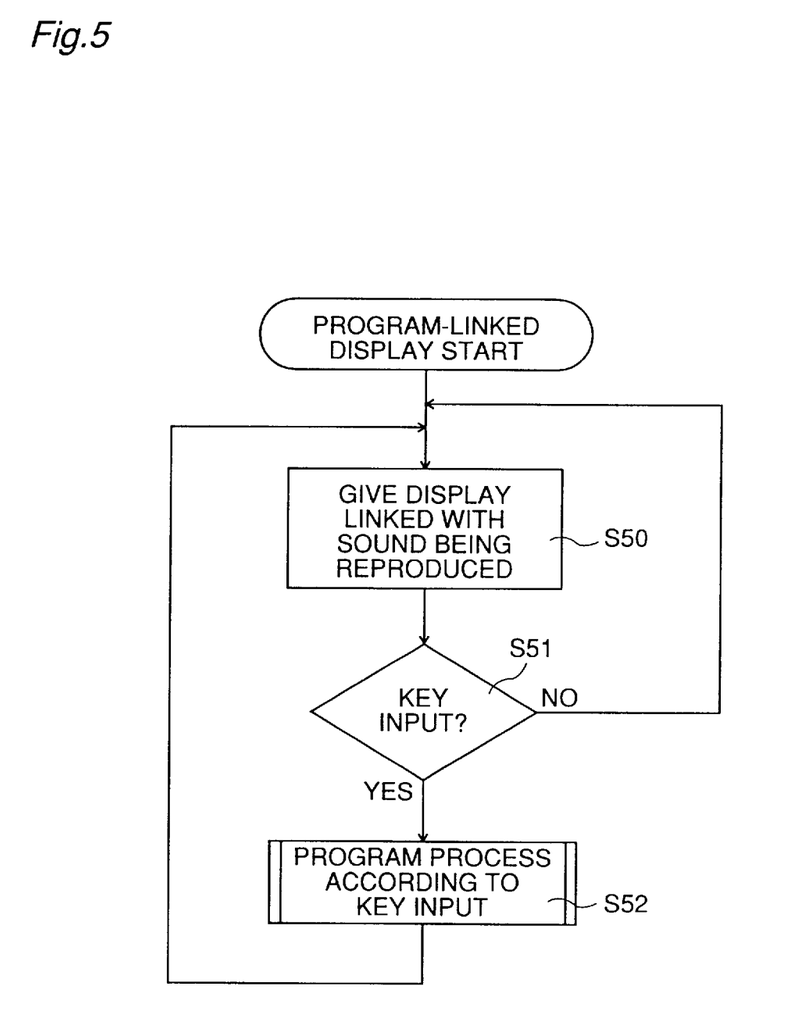
FIG. 5 is a flow chart showing the process of program-linked display performed by the apparatus shown in FIG. 1.

Next, referring to FIG. 5, the process performed in the program-linked display will be described.

In step S50, a display linked to the audio sound being reproduced is given on the display. In this process, of the information written in the RAM 8, data linked to the program is read by the CPU 6.

In step S51, whether or not there is a key input from the user through the switches 9 is determined. If it is YES, a process corresponding to the input is performed in step S52, and then the process starting from step S50 continues.

Here, the process corresponding to the input may be a process of reading the main menu, and selecting a program by manual operation so that a page is displayed.

If it is NO in step S51, the processes from step S50 are repeated.

Figure 6:
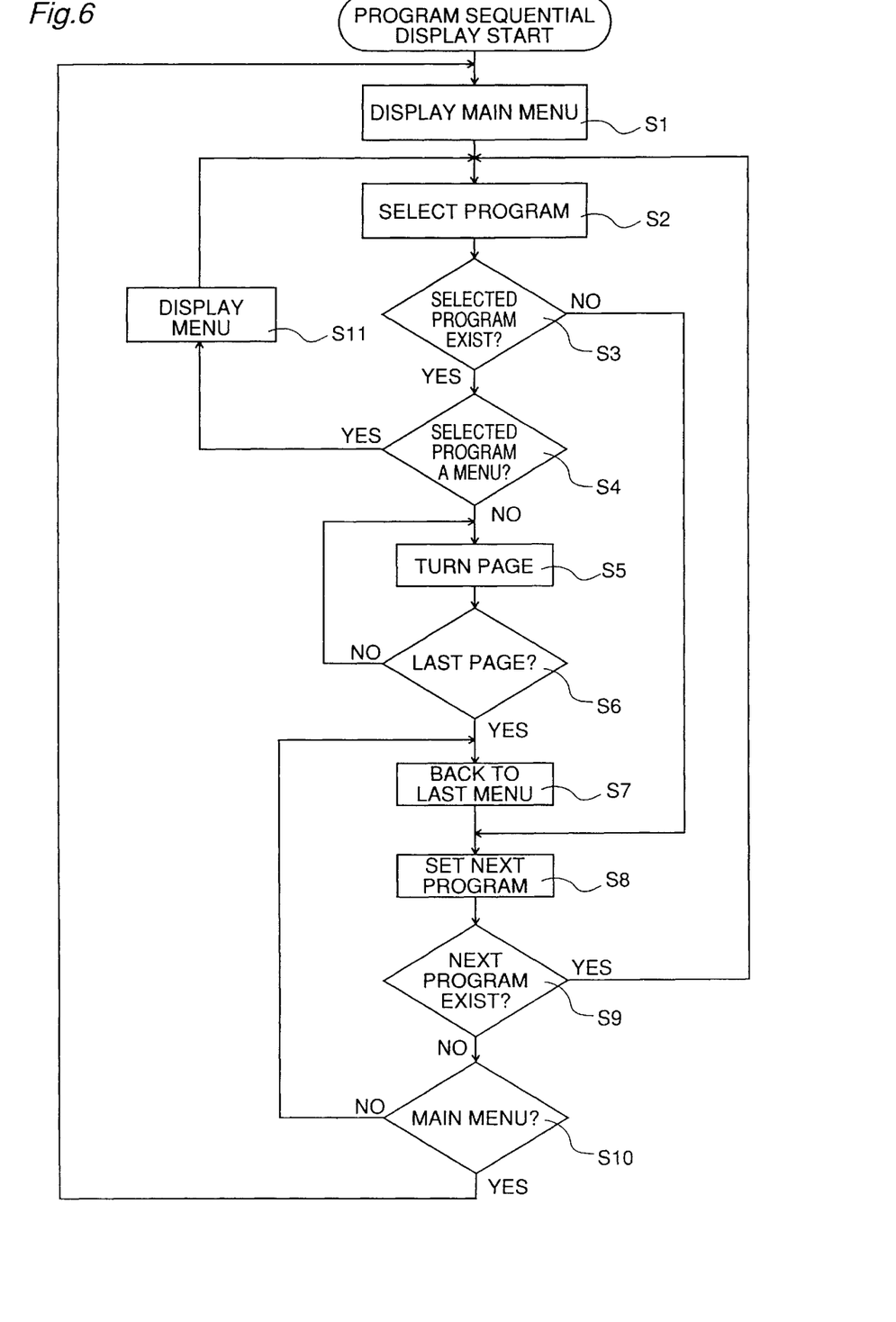
FIG. 6 is a flow chart showing the process of program sequential display performed by the apparatus shown in FIG. 1.

FIG. 6 is a flow chart showing the process performed in the program sequential display.

Referring to FIG. 6, in step S1, a main menu (represented by the character 27 in FIG. 4) is displayed. In step S2, a program which has not yet being selected (any of 28a, 29d, 28b of FIG. 4) is selected.

In step S3, whether there is a program to be selected is determined. If it is YES, in step S4, whether the selected program is a sub menu or not is determined. If it is NO in step S4, the selected program is displayed in step S5, and pages included in the program are successively displayed. In step S6, whether or not the page is the last page is determined. If it is NO, the processes from step S5 are repeated. If it is YES, in step S7, the flow returns to the menu display on the stage higher by one. Here, the menu higher by one means, for example, sub menu 28a viewed from page 29a of FIG. 4.

In step S8, selection of another program positioned below the menu is performed.

In step S9, whether there is a program to be selected is determined. If it is NO in step S9, in step S10, whether or not the menu is a main menu is determined. If it is YES in step S10, the processes from step S1 are repeated.

If it is NO in step S3, processes from step S8 are performed.

If it is YES in step S4, the menu is displayed in step S11, and processes from step S2 follow.

If it is NO in step S10, processes from step S7 are performed.

A specific example of the program sequential display shown by the flow chart of FIG. 6 will be described.

Figure 7:
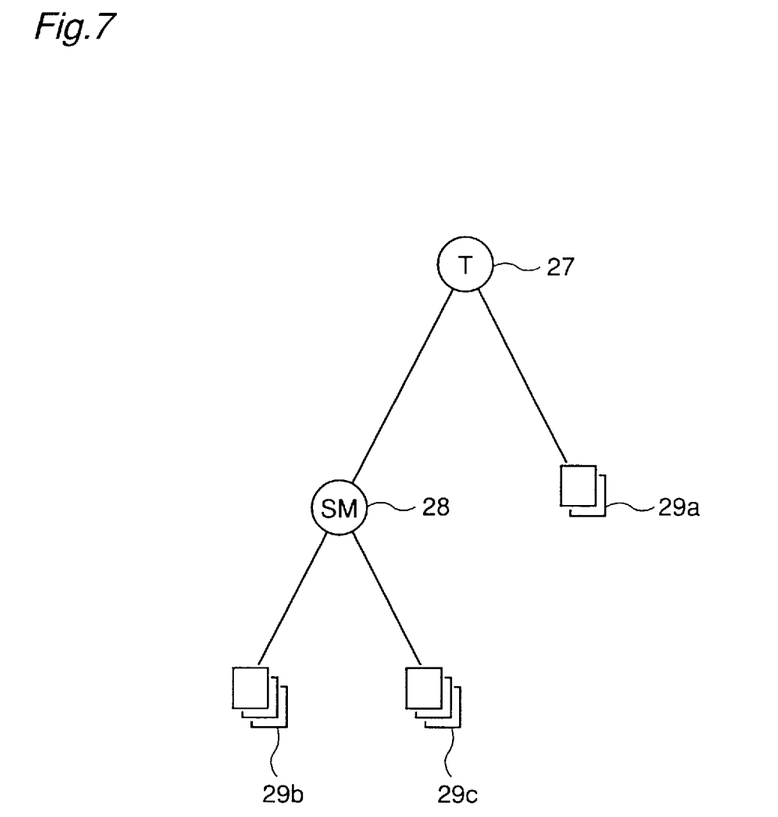
FIG. 7 shows a specific example of a tree structure.
Figure 8A:
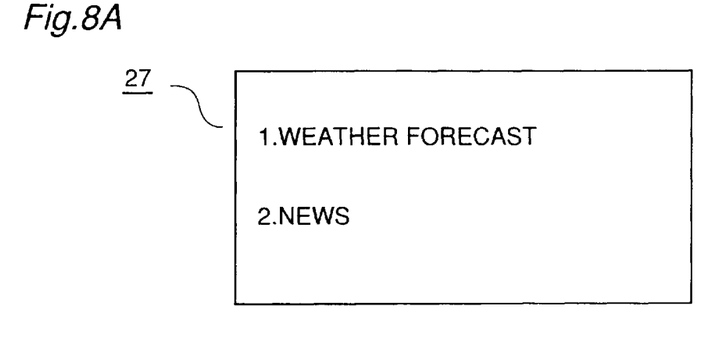
FIGS. 8A to 8E are illustrations showing the order of display of the program data groups having the tree structure shown in FIG. 7, in program sequential display.
Figure 8B:
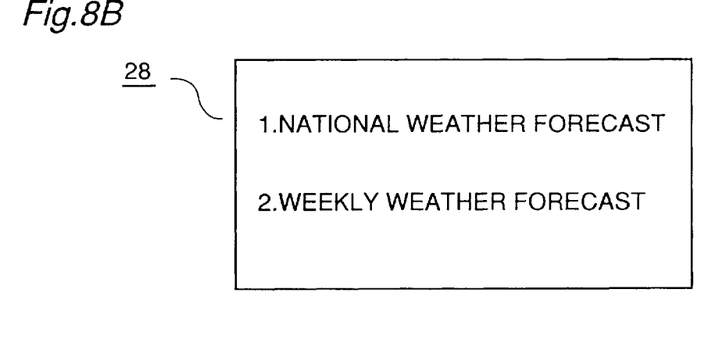
Figure 8C:
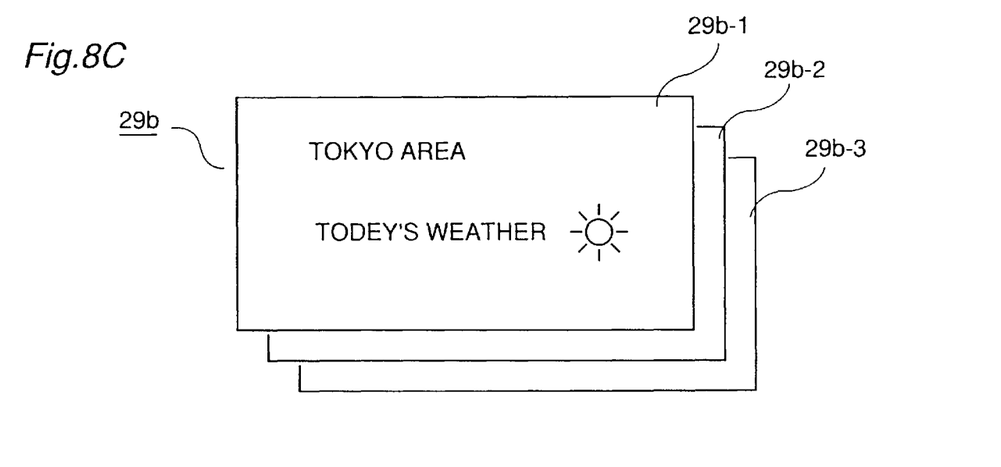

Referring to FIG. 7, it is assumed that the program stored in the RAM has such a tree structure that has main menu 27 at the vertex. Below the main menu 27, there are a sub menu 28 and a page 29a, and there are pages 29b, 29c below the sub menu 28. The main menu 27 is a menu including characters "weather forecast" and "news", as shown in FIG. 8A. The sub menu 28 is positioned below or lower stage of "weather forecast" of the main menu, which sub menu includes items "national weather forecast" and "weekly weather forecast", as shown in FIG. 8B. The page 29b is data including three pages (29b-1 to 29b-3) as shown in FIG. 8C, which is related to the item "national weather forecast" of sub menu 28.

Figure 8D:
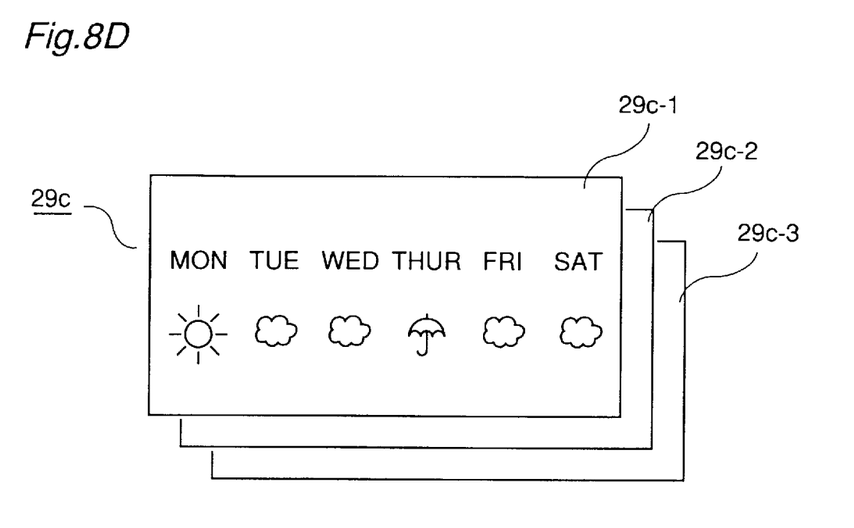
Figure 8E:
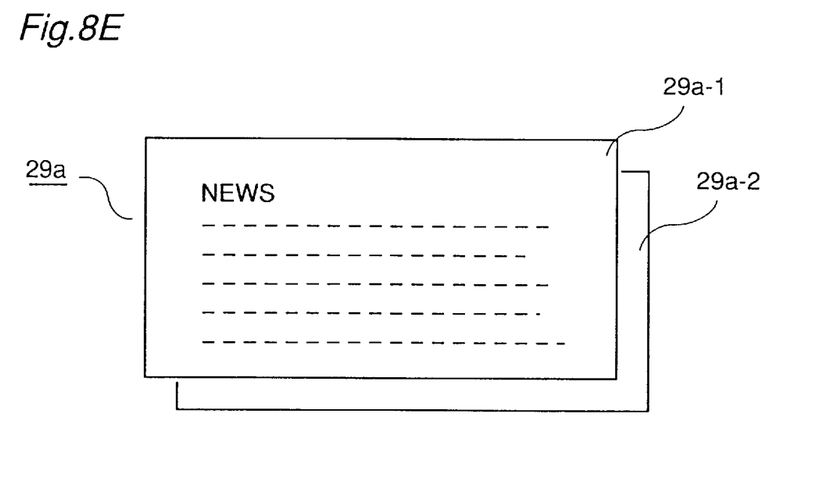

Page 29c includes three pages (29c-1 to 29c-3) as shown in FIG. 8D, and it is related to the item "weekly weather forecast" of sub menu 28. Page 29a includes two pages (29a-1 to 29a-2) as shown in FIG. 8E, which is related to the item "news" of main menu 27. When switch SW1 is ON, which means that program sequential display is selected, the stored contents are displayed in the following order on display unit 10. Namely, "main menu 27→sub menu 28—page 29b-1→page 29b-2→page 29b-3→sub menu 28→page 29c-1→page 29c-2→page 29c-3→menu 27→page 29a-1→page 29a-2."

As the programs stored in the RAM are displayed successively, the user can see all the contents without any key operation.

Here, when a menu is displayed, a program item to be displayed next in the displayed menu may be marked. For example, when the display shown in FIG. 8B follows the display of FIG. 8A, then the numeral "1" allotted to the item "weather forecast" may be marked by a circle, for example, when the display of FIG. 8A is given.

Further, the manner of display may be adapted to successively display contents of pages only, not displaying the menus.

Figure 9:
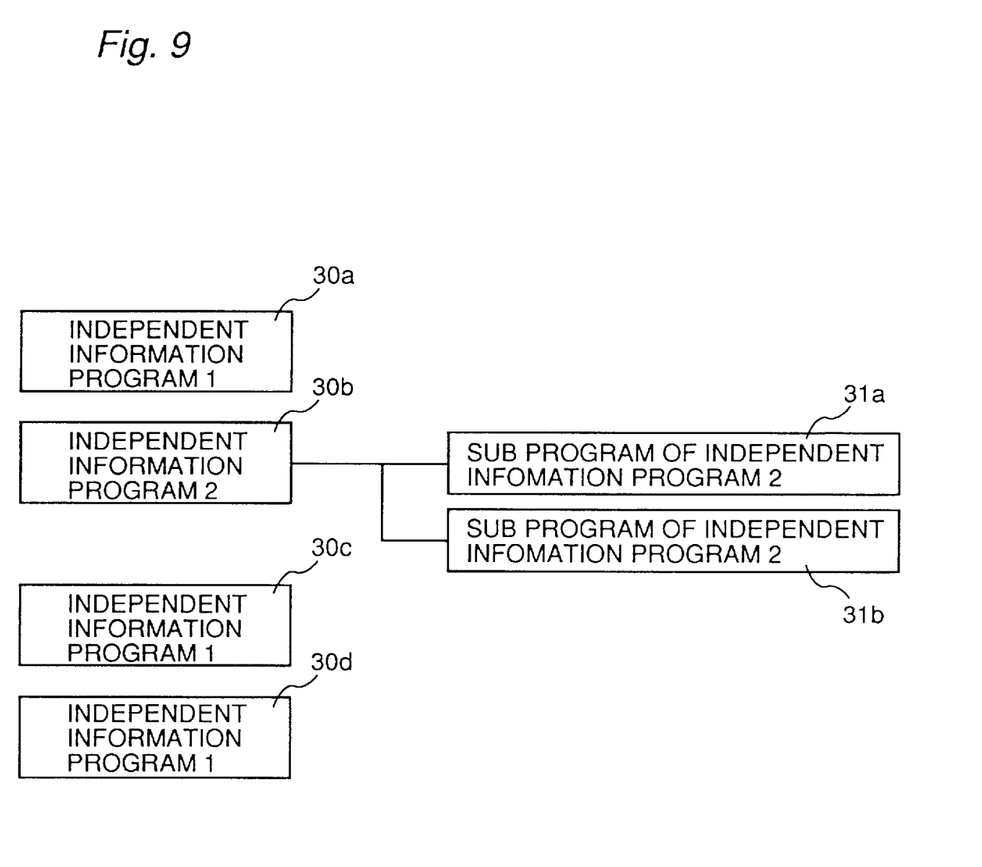
FIG. 9 shows another specific example of the structure of the program data stored in the RAM.

Further, in the above described embodiment, it is assumed that the program information has a tree structure. However, as shown in FIG. 9, the program information may be stored independent from each other. Referring to FIG. 9, assuming that independent program information 30a to 30d and sub program information 31a and 31b belonging to program information 30b are stored in the RAM, the program sequential display may be performed in the following order. Namely "30a→30b→31a→31b→30c→30d."

Figure 10:
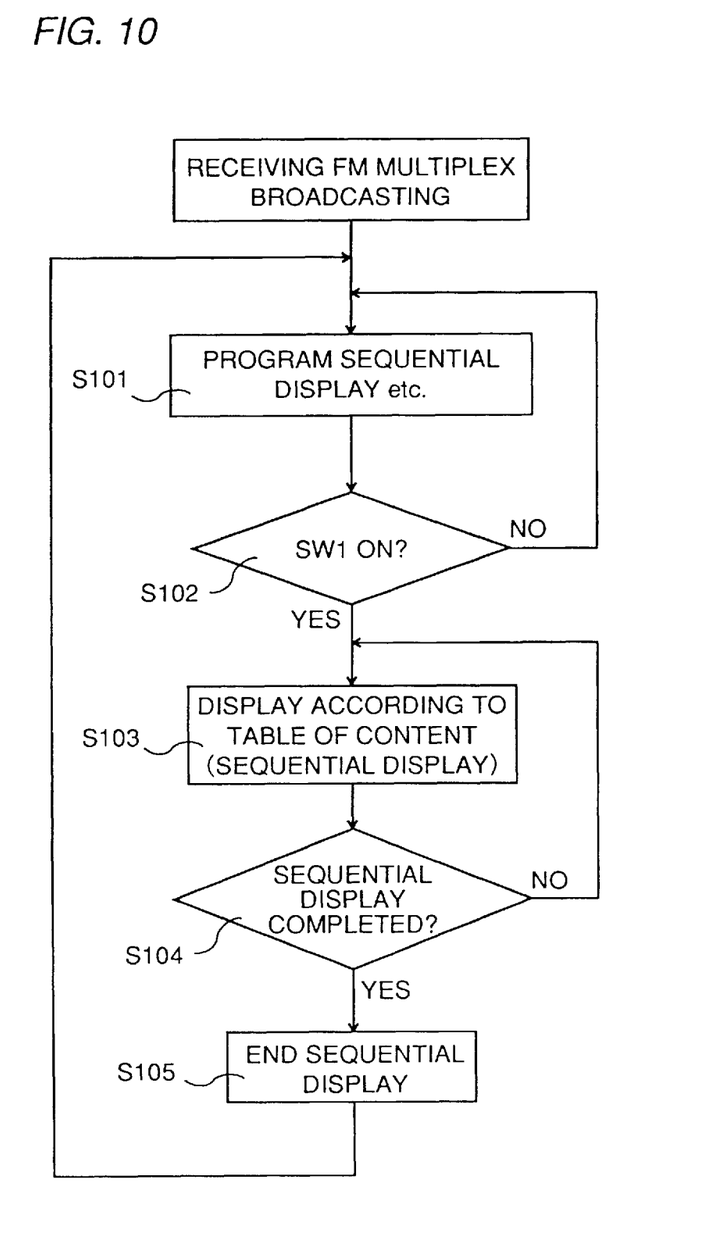
FIG. 10 is a flow chart showing multiplex broadcast receiving process performed by the apparatus in accordance with a second embodiment.

FIG. 10 is a flow chart showing the receiving process performed by the multiplex broadcast receiving apparatus in accordance with the second embodiment.

The structure of the apparatus in accordance with the embodiments described below is substantially the same as that shown in FIG. 1. Therefore, description is not repeated.

Referring to FIG. 10, in step S101, the program-linked display is given. At this time, a process for displaying other program by a key input may be performed.

In step S102, whether or not the auto-mode key SW1 is on is determined. If it is YES, in step S103, the program sequential display is given. In step S104, whether or not the program sequential display is completed is determined. If it is YES in step S104, the program sequential display is completed in step S105, and program-linked display from step S101 is again performed.

If it is NO in step S102, the processes from step S101 are repeated. If it is NO in step S104, processes from step S103 are repeated.

This embodiment is characterized in that when the contents of the stored programs are all displayed once in the program sequential display, the program-linked display is resumed.

Figure 11:
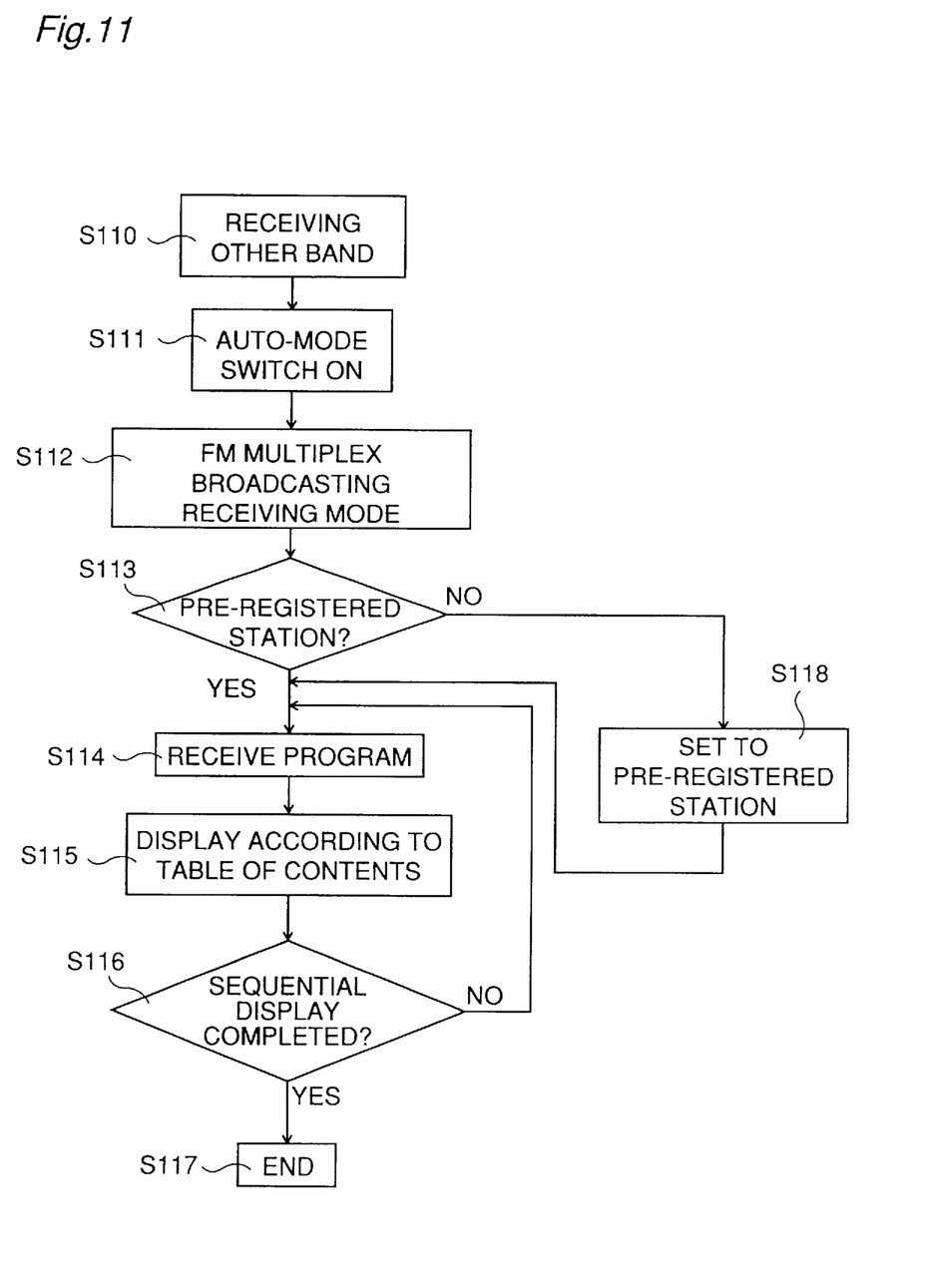
FIG. 11 is a flow chart showing multiplex broadcast receiving process performed by the apparatus in accordance with a third embodiment.

FIG. 11 is a flow chart showing the receiving process performed by the receiving apparatus in accordance with the third embodiment.

Referring to FIG. 11, when in step S110 the apparatus is receiving signals belonging to a band (for example, the band of AM broadcast) other than the band in which FM multiplex broadcast is transmitted and the auto-mode switch SW1 is pressed in step S111, then the receiving band is switched in step S112, and reception of FM multiplex broadcast starts. In step S113, whether or not reception from a broadcasting station registered in advance in the apparatus is possible or not is determined. If it is YES, FM multiplex broadcast is received in step S114, and the program sequential display is given in step S115. Whether or not the program sequential display is completed is determined in step S116, and if it is YES, the flow returns to the state of step S110 before the pressing of the auto-mode switch SWI.

If it is NO in step S113, frequency is set to a broadcast station which is registered in advance in step S118, and processes from step S114 are performed. If it is NO in step S116, processes from step S114 are performed.

Figure 12:
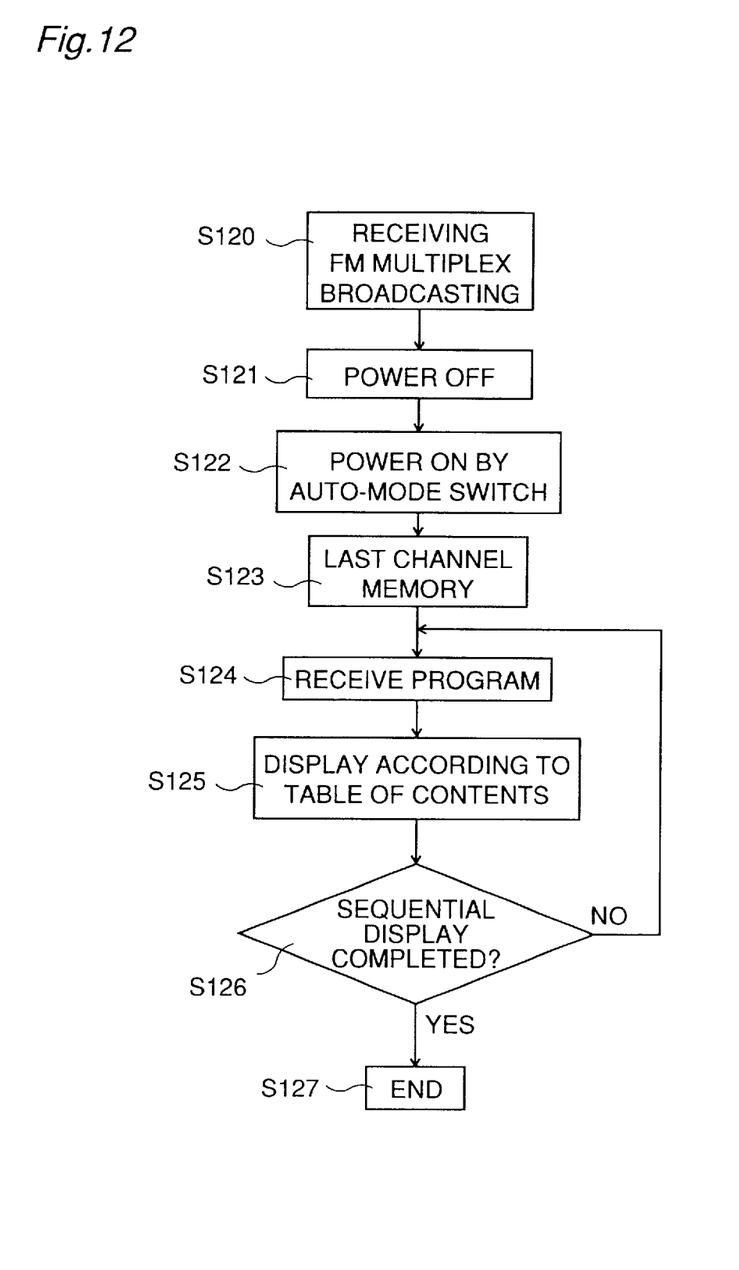
FIG. 12 is a flow chart showing multiplex broadcast receiving process performed by the apparatus in accordance with a fourth embodiment.

FIG. 12 is a flow chart showing the receiving process by the FM multiplex broadcasting receiving apparatus in accordance with the fourth embodiment.

The receiving apparatus in accordance with the present embodiment is characterized in that the band and the frequency received at the time of power off are stored, and when the power is turned on again, reception at the stored band and frequency is started.

Referring to FIG. 12, assume that FM multiplex broadcast is received in step S120 and power is turned off in step S121.

When auto-mode switch SWI is pressed in step S122 and the power is turned on, reception at the stored band and frequency is performed in step S123. Then, in step S124, a program is received and the program sequential display is performed in step S125.

In step S126, whether or not the program sequential display is completed is determined, and if it is YES, the flow returns to the program-linked display.

If it is NO in step S126, the processes from step S124 are repeated.

Figure 13:
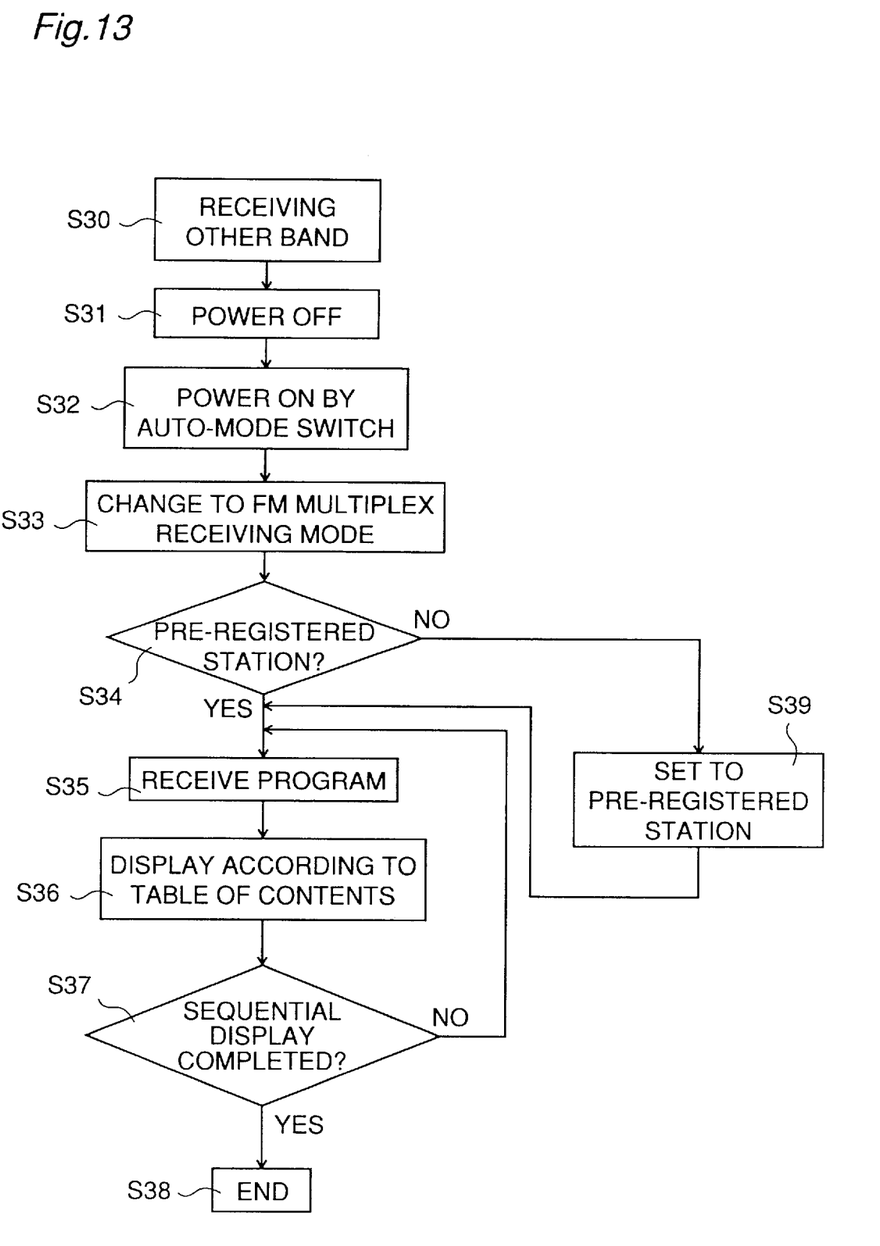
FIG. 13 is a flow chart showing multiplex broadcast receiving process performed by the apparatus in accordance with a fifth embodiment.

FIG. 13 is a flow chart showing the process performed by the multiplex broadcasting receiving apparatus in accordance with the fifth embodiment.

Referring to the figure, assume that reception in a band other than FM multiplex broadcast is being performed in step S30, and then the power is turned off in step S31.

When the auto-mode switch SWI is pressed in step S32 and the power is turned on, the band for reception is changed to the band of FM multiplex broadcast in step S33.

In step S34, whether or not a pre-registered frequency is set in the apparatus is determined. If it is YES, a program is received in step S35, and program sequential display is given in step S36. In step S37, whether the program sequential display is completed is determined. If it is YES, the program sequential display is completed in step S38 and the flow proceeds to program-linked display.

If it is NO in step S34, a frequency pre-registered in the apparatus is set in step S39, and reception at the set frequency is performed in step S35.

If it is NO in step S37, the processes from step S35 are repeated.

According to this embodiment, even in a receiving apparatus which stores the frequency received at the time of power off, FM multiplex broadcast is automatically received when the power is turned on by the auto-mode switch. More specifically, when the power is turned on by a common power switch, a program at the same frequency as the frequency of the broadcast received at the time of power off is received. Meanwhile, when the power is turned on by the auto-mode switch, reception of FM multiplex broadcast is forced, and program sequential display is given.

Figure 14:
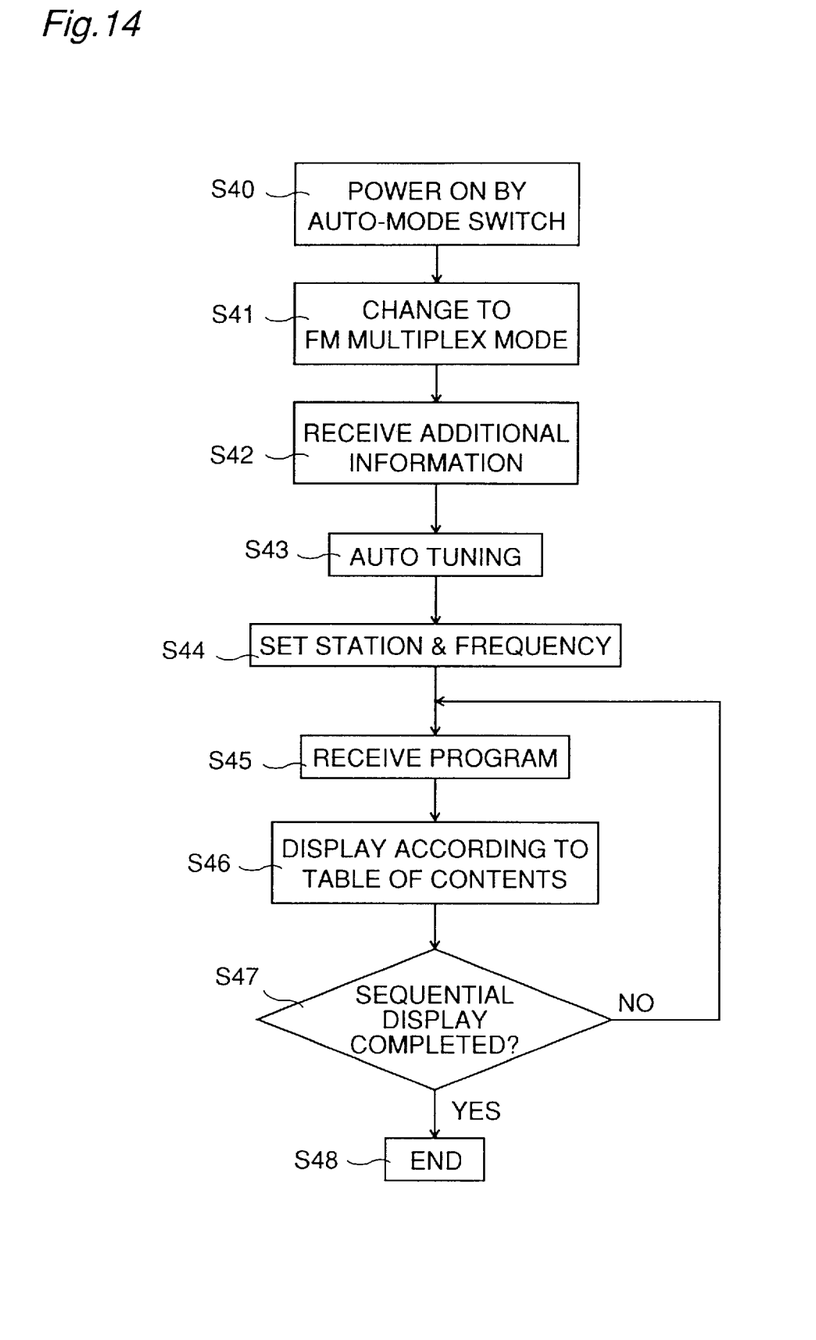
FIG. 14 is a flow chart showing multiplex broadcast receiving process performed by the apparatus in accordance with a sixth embodiment.

FIG. 14 is a flow chart showing the receiving process performed by the receiving apparatus in accordance with the sixth embodiment.

The apparatus in accordance with the present embodiment is characterized by the following operation.

When the user presses an auto-mode switch SW1, the power is turned on. Additional information for service identification defined in a prefix of FM multiplex broadcast is received, and display is given utilizing the additional information. The additional information includes information for controlling the receiver, such as the name of broadcasting station, year, month, date, day of the week, time, frequency of an adjacent broadcasting station broadcasting the same program, and so on.

Referring to the figure, when the power is turned on by the auto-mode switch SW1 in step S40, reception of FM multiplex broadcasting is forced in step S41 regardless of the band at the time of power off. In step S42, the additional information is received.

In step S43, tuning to the frequency of the most appropriate broadcasting station of the stations giving FM multiplex broadcasting is performed. In step S44, the broadcasting station and the frequency are set and displayed on the display unit, and in step S45, reception of the program starts. In step S46, the program sequential display is given, and whether or not the sequential display is completed is determined in step S47. If it is YES in step S47, the sequential display is terminated in step S48, and program-linked display is given.

If it is NO in step S47, processes from step S45 are performed.

As described above, by turning the power on by the auto-mode switch, all the contents of the programs received can be seen successively without any key operation by the user. Namely, when the user wishes to see all the programs received, the user has only to operate one key, and hence it is very convenient for operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for receiving multiplex broadcast and for displaying from multiplexed programs included in the broadcast, comprising:

storing means for storing received broadcast programs and assigning the stored programs to a plurality of data groups included in the multiplex broadcasting;

display means for automatically switching from a display of one of said data groups to a display of another of said stored plurality of data groups; and a key input, wherein activation of solely said key input initiates the display of the one data group and the automatic switching from the display of the one data group to the display of the another data group.

2. The apparatus according to claim 1, wherein said display means automatically sequences through the display of each program in each of said plurality of data groups.

3. The apparatus according to claim 2, wherein activation of solely said key input initiates the automatic display, by said display means, of each program in each of said plurality of data groups.

4. The apparatus according to claim 1, wherein said stored plurality of data groups are organized in a multi-stage hierarchical tree structure wherein at least one of the stages has a plurality of hierarchically equal data groups, and said display means automatically displays the plurality of data groups successively, starting from a data group at an upper stage to a data group of a lower stage of said tree structure, and returning to another data group at the upper stage if the another data group is present and has not yet been displayed.

5. The apparatus as claimed in claim 4, wherein the data group of the upper stage is a sub-menu, and the data group of the lower stage includes a data page corresponding to an entry in the sub-menu.

6. The apparatus according to claim 1, wherein said plurality of data groups includes a first data group constituting a menu, and a second data group containing information received in one of the received broadcast programs.

7. The apparatus according to claim 1, wherein said multiplex broadcasting is FM multiplex broadcasting.

8. The apparatus of claim 1, wherein said key input turns said apparatus on before initiating the automatic display.

9. The apparatus of claim 8, wherein activation of said key input forces reception of a predetermined multiplex broadcasting station regardless of the broadcasting band being received at time of power off.

10. An apparatus for receiving multiplex broadcasting and for displaying data from multiplexed programs included in the broadcast, comprising:

receiving means for receiving the multiplex broadcasting;

obtaining means for obtaining sets of program data from said received multiplex broadcasting, said program data belonging to programs included in the multiplex broadcasting;

storing means for storing said obtained program data;

first display means for automatically switching from the display of one program to the display of a next program from said stored program data; and a key input, wherein activation of said key input initiates the display of the one data group and automatic switching from the display of the one data group to the display of the another data group.

11. The apparatus according to claim 10, wherein said first display means automatically and successively switches from the display of one program from said stored data to the display of the next program from said stored data at every prescribed time interval.

12. The apparatus according to claim 11, further comprising:

second display means for displaying, in real time, said obtained program data.

13. The apparatus according to claim 12, further comprising switching means for switching between said first and second display means, and said first and second display means have a common display unit.

14. The apparatus according to claim 13, wherein said switching means activates said second display means when display of all said stored data is completed by said first display means.

15. The apparatus according to claim 12, further comprising:

output means for outputting the received multiplex broadcasting as an audio sound, wherein said second display means displays program data corresponding to the audio sound output from said output means.

16. The apparatus according to claim 10, wherein said first display means displays, when display of all said stored data is completed, the data again from the start.

17. The apparatus according to claim 10, further comprising a switch, wherein said receiving means receives the FM multiplex broadcasting and said first display means is activated, when said switch is turned on.

18. The apparatus according to claim 17, further comprising:

means for storing a frequency to be received, wherein said receiving means automatically receives broadcasting at said stored frequency upon activation of said switch regardless of the broadcasting frequency received when said apparatus is turned off.

19. The apparatus according to claim 10, further comprising:

means for storing a predetermined frequency for receiving FM multiplex broadcasting, wherein said receiving means receives said stored frequency when power is turned on, regardless of a broadcasting frequency received when power is turned off.

20. The apparatus according to claim 10, wherein said receiving means receives the FM multiplex broadcasting and said first display means is activated, when power is turned on.

21. The apparatus according to claim 10, further comprising means for obtaining additional information from said received multiplex broadcasting, and means for displaying said additional information.

22. The apparatus according to claim 21, wherein said additional information includes a name of a broadcasting station.

23. The apparatus according to claim 21, wherein said means for obtaining said additional information is activated when power is turned on.

* * * * *